INVENTORS
RICHARD M. CHAPMAN
BY DONALD M. YORE
MAHONEY, MILLER & RAMBO
BY
ATTORNEYS

United States Patent Office 3,450,986
Patented June 17, 1969

3,450,986
MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD
Richard M. Chapman and Donald M. Yore, Columbus, Ohio, assignors to F. W. Bell Inc., Columbus, Ohio, a corporation of Ohio
Filed Apr. 6, 1966, Ser. No. 540,593
Int. Cl. G01r 33/14
U.S. Cl. 324—40
6 Claims

ABSTRACT OF THE DISCLOSURE

Non-destructive testing of electrically conductive materials is accomplished utilizing apparatus which induces a flow of eddy currents in the test material and detects a resultant magnetic field which resultant magnetic field is indicative of the characteristics or condition of the test material in the region where the eddy currents are induced. The apparatus comprises a magnetizing coil forming a closed loop disposed in close proximity to a surface of the material, and thus induces a flow of eddy currents in the material, and a semiconductor, magnetic-field-sensing device disposed radially outward of the coil which responds to both the magnetizing field and the magnetic-reaction-field produced by the eddy-currents. The semiconductor device is of a size and configuration to respond to only a small portion of the total resultant magnetic field and is thereby capable of detecting relatively small, localized anomalies in the test material which affect the eddy current flow path.

---

This invention relates, in general, to a method of and apparatus for nondestructive testing of electrically conductive materials utilizing eddy currents. It relates more specifically, to a method of and apparatus for nondestructive testing of materials which are incorporated in structures and are provided with through fasteners or integral fastening devices and which includes semiconductor devices operable to provide an output signal related to the eddy currents produced in the material.

Aeronautical structures formed in accordance with conventional fabrication techniques comprise several structural members which are fastened or otherwise secured together to form an integral air frame structure. Fastening is accomplished by utilizing devices of either the rivet or bolt type which extend through the material for clamping several elements into an integral structure. Utilization of either a bolt or rivet type fastening device requires the formation of aligned apertures of suitable configuration in the members through which the fastening device is to extend. Drilling and punching are two well-known techniques for forming the required apertures in the structural elements in accordance with conventional fabrication techniques. Although the formation of the apertures in accordance with prior art techniques may be readily accomplished, thhe forming operation may adversely affect the metallurgical and structural characteristics of the material. Formation of an aperture in accordance with prior art techniques results in the generation of a substantial amount of heat in the vicinity of the aperture as a consequence of friction or working of the material and this heat is eventually dissipated in some manner. In the conventional fabrication techniques, this heat may be dissipated through the material itself and ultimately transferred to the air or surrounding environment for complete removal. Heat transfer in the materials normally utilized in the fabrication of air frames and, in particular, metals such as aluminum, is relatively rapid and the heat generated in the vicinity of the aperture is, therefore, dissipated at a relatively rapid rate. The rapid dissipation of heat functions as a quenching action resulting in the embrittlement of the material surrounding the aperture thereby contributing to deterioration of the metallurgical characteristics and a reduction in structural strength. The effects of such embrittlement are not ascertainable at the time of formation of the aperture by conventional inspection techniques and apparatus as there will be no outward, visible indications of such embrittlement. It is only after the material has been stressed that the effects of such embrittlement will be observed. Thus, in the usual sequence of operations, the several structural members will be secured together by the appropriate fastening means and the air frame structure then utilized as designed. The elements are then stressed and this may result in the formation of minute cracks which may be internal in the immediate vicinity of the aperture as a result of the reduced structural strength and deterioration of the metallurgical characteristics of the material. The undetected development of such cracks may result in series structural failures.

Heretofore, the detection of such cracks or defects in the material surrounding the holes or apertures has only been possible with disassembly of the several elements by removal of the fastening devices. The material surrounding the holes or apertures may then be inspected with the prior art apparatus and techniques although internal cracks may not be detected. Disassembly of the elements through removal of the fastening devices is a relatively expensive and time-consuming operation and employment of appropriate testing procedures for the detection of such cracks and refects has, therefore, been deferred until scheduled maintenance and inspection procedures are deemed necessary or if some event or external charactristic indicates a possible failure of a particular element.

It is, therefore, the primary objective of this invention to provide a method and apparatus for nondestructive testing of electrically conductive material adjacent a hole or other discontinuity.

It is a further object of this invention to provide a nondestructive materials testing apparatus utilizing the principles of magnetic reaction for detection of internal discontinuities or defects which are adjacent a visible discontinuity.

It is an object of this invention to provide a magnetic reaction test apparatus having a closed loop inductor coil for generating a magnetic field and a semiconductor detector device disposed a distance radially outward of the magnetizing inductor coil for detecting a portion of the magnetic-reaction-field which is formed by the circulating eddy currents induced in an electrically conductive material.

It is a still further object of this invention to provide a method for nondestructive testing of materials which consist of inducting an eddy current flow in the material and detecting a portion of the resultant magnetic-reaction-field which is external to the effective concentration of the circulating eddy currents for greatly enhancing the resolution of the indication.

It is also an object of this invention to provide a method of and apparatus for nondestructive testing of materials surrounding an aperture or other visible discontinuity and which does not require the removal of an element assembled therewith or the fastening device.

These and other objects and advantages of this invention will be readily apparent from the following detailed description of an embodiment thereof and the accompanying drawings.

Figure 1:
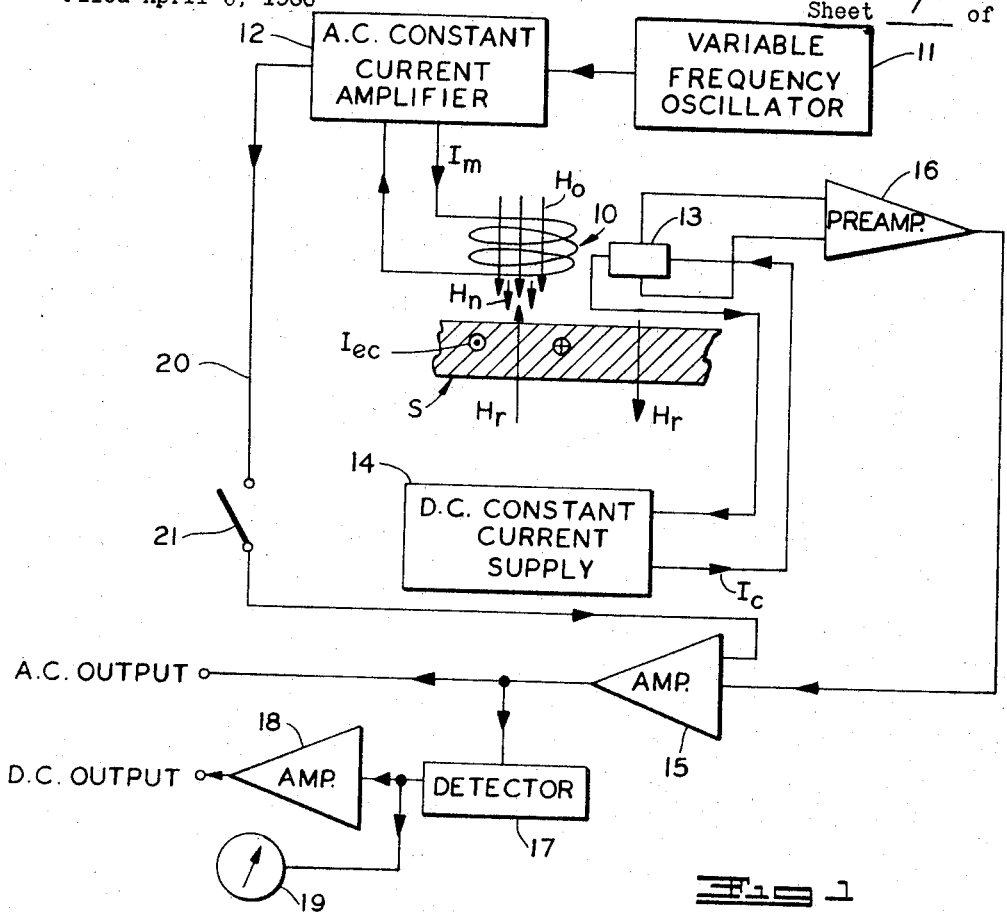
FIGURE 1 is a diagrammatic illustration of a magnetic reaction test apparatus embodying this invention.

Having reference to the drawings, and specifically to FIGURE 1, the magnetic reaction test apparatus of this invention is seen to comprise a magnetic field generating means and a magnetic reaction detection means which are adapted to be disposed in operative relationsip to a structural member or test specimen S. The magnetic field generating means includes a magnetization inductor coil 10 of the closed loop type which may be selectively energized by passage of a magnetization current $I_m$ through the coil. The magnetization current $I_m$ is produced by a variable frequency oscillator 11 and amplified by an alternating current, constant-current amplifier 12. A variable frequency oscillator 11 is preferably provided to permit selective operation of the apparatus at a particular desired frequency to provide optimum test conditions for a particular material or structural member being tested. The A.C. waveform magnetization current $I_m$ flowing through the inductor coil 10 will generate an alternating magnetic field $H_o$. Placing the coil 10 in close proximity to a surface of the test specimen S so as to provide the necessary inductive coupling between the coil 10 and the test specimen S will result in the inducement of a flow of eddy currents $I_{ec}$ of alternating waveform within the test specimen. The eddy currents $I_{ec}$ thus induced are illustrated as effectively concentrated as a mirror image of the inductor coil 10 although it is to be understood that the eddy currents will be nonuniformly distributed in the test specimen as to both radial distribution and depth of penetration in the test specimen. The depth of penetration of the eddy currents will be dependent on the frequency of the magnetizing current $I_m$.

The circulating eddy currents $I_{ec}$ thus induced in the test specimen S will produce a magnetic reaction field $H_r$ which is also of A.C. waveform but opposes the magnetizing field $H_o$. This magnetic reaction field $H_r$ being formed by the eddy currents will encircle the eddy currents with the magnetic field intensity being determined by the configuration of the eddy currents. Due to magnetic coupling losses and resistance to the flow of electrical currents in the test specimen, the magnetic reaction field $H_r$ will be less than the magnetizing field $H_o$ and when vectorially combined, provide a resultant magnetic field $H_n$. Reactive impedances present necessitate consideration of the vectorial components of the magnetizing and reaction fields.

The magnetic-reaction-field $H_r$ may also be considered an effectively concentrated centrally of the eddy currents $I_{ec}$ and at a predetermined distance externally of the assumed normal configuration of the eddy currents. Assuming for purposes of illustration that the eddy currents $I_{ec}$ are effectively concentrated in a circular pattern, as illustrated in FIGURE 1, the magnetic-reaction-field $H_r$ will be of a generally toroidal configuration encircling the eddy currents but with portions thereof present above the surface of the test specimen. This magnetic reaction field $H_r$ is dependent on the configuration of the eddy currents flowing in the test specimen S and will thus be capable of providing an indication of electrical discontinuities or defects in the material of the test specimen which affect or otherwise distort the normally symmetrical configuration of eddy currents irrespective of whether such discontinuities open at the surface.

Detection of the magnetic-reaction-field is accomplished by a detection means which includes a semiconductor device 13 responsive to magnetic fields and adapted to be positioned adjacent the magnetization coil 10. The semiconductor device 13 may comprise a Hall-effect device and which is disposed in electromagnetically coupled relationship with the magnetic reaction field with the magnetic axis of the Hall-element preferably aligned with the axis of the magnetic-reaction-field and substantially normal to the surface of the test specimen S. For operation of a Hall-effect device, a control current $I_c$ is provided which flows through the element along the current axis thereof in quadrature to the magnetic axis. In accordance with this magnetic reaction test apparatus, the control current $I_c$ is supplied by a direct current, constant-current supply 14. With the Hall device 13 thus positioned in the magnetic-reaction-field, an output or Hall voltage of A.C. waveform will be generated across the voltage axis of the element and this output signal may then be amplified by a suitable amplifier 15. A preamplifier 16 may also be advantageously incorporated in circuit with the Hall voltage terminals of the Hall device 13 and the amplifier 15. With the magnetizing inductor coil 10 energized with a suitable magnetizing current $I_m$ of A.C. waveform, the output signal from the amplifier 15 will also be of alternating current waveform. This A.C. output may then be utilized with appropriate apparatus and equipment for control or indicating functions as may be desired. Also, a suitable detector circuit 17 may be interconnected with the output of the amplifier 15 to provide a direct current output. An amplifier 18 may be connected to the output of the detector 17 to provide an amplified D.C. output signal or a suitable indicating meter 19 may be interconnected with the detector 17 to provide a visual indication of the output signal.

The test apparatus, as described herein, is not solely dependent upon the magnetic reaction field $H_r$ but is also indicative of the total magnetic field detected by the Hall element 13. The magnetizing field $H_0$ is also effective in producing an output signal by means of the Hall device 13 and the output signal is accordingly indicative of the total magnetic field $H_n$. However, the output signal will be indicative of any defects or discontinuities existent in the test specimen S and capable of affecting the eddy currents $I_{ec}$. If so desired, the previously described circuit may be modified so as to provide either an A.C. or D.C. output which is indicative only of the magnetic-reaction-field $H_r$. This is accomplished by means of circuitry effective in subtracting the magnetizing field $H_o$ effect from the output signal generated by the Hall element 13. This is most readily accomplished by a suitable connection from the A.C. constant current amplifier 12 through the conductor 20 to the amplifier 15. An appropriate switching mechanism 21 may be incorporated in this conductor for selective operation of the apparatus in determining either the total magnetic field $H_n$ or only the magnetic-reaction-field $H_r$. The A.C. signal supplied by the A.C. amplifier 12 to the amplifier 15 is adjusted to be equal in magnitude but subtractive to the signal supplied to the amplifier 15 when the magnetizing inductor coil 10 and the Hall element 13 are remote from a test specimen such as S and is thus effective in eliminating the magnetizing field $H_o$ from the output signal.

Figure 2:
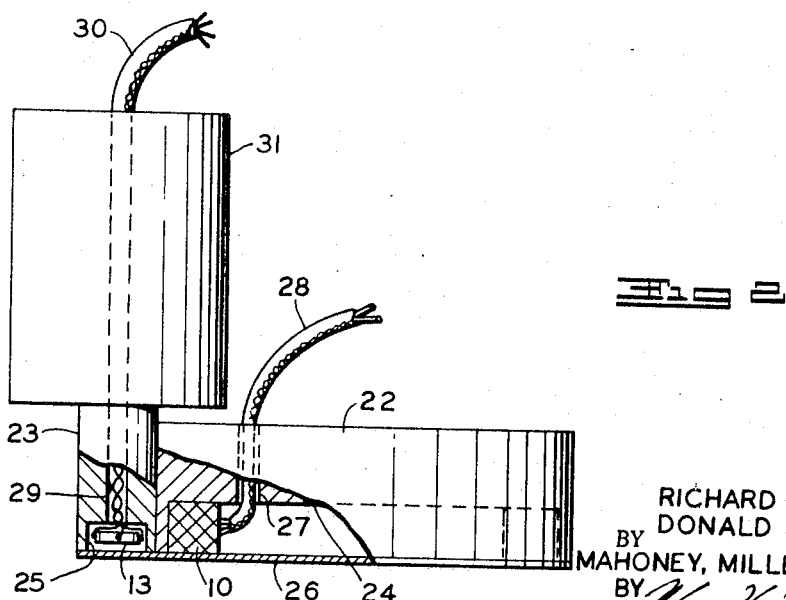
FIGURE 2 is an elevational view, partly in section, of a magnetic-field-generating and magnetic-field-detection probe unit for the apparatus of FIGURE 1.

In accordance with this invention, the inductor coil 10 and the semiconductor device 13 of the magnetic reaction field detector means are incorporated in a suitable probe structure, such as is best illustrated in FIGURE 2. The illustrated probe unit comprises a housing structure 22 for support of the inductor coil 10 and a protective casing 23 for the Hall device 13. A recess 24 is formed in an end face of the housing structure 22 for receiving the inductor coil 10. In the illustrated example, the inductor coil 10 which is of the closed loop type is circularly shaped and an appropriate cylindrical recess 24 is formed in a lower surface of the housing structure. A suitable cavity 25 is formed in the base of the protective casing 23 for reception and support of the Hall device 13. Both the recess 24 and cavity 25 may be filled with a suitable encapsulating compound for protection and support of the coil 10 and Hall device 13. For further protection of the coil 10 and Hall device, a bottom cover plate 26 preferably formed from a nonmagnetic and nonelectrically conducting material may be attached to the housing structure 22 and the protective casing 23 to close the recess 24 and cavity 25. An aperture 27 is formed in the housing structure 22 for passage of a magnetizing current cable 28 from the A.C. amplifier 12 to the inductor coil 10.

The protective casing 25 housing the Hall device 13 is disposed at a side of the housing structure 22 carrying the inductor coils 10 and the Hall device 13 will thus be radially-outwardly displaced relative to the inductor coil 10. In this illustrated embodiment, the protective casing 23 is rigidly attached to the housing structure 22 by suitable means, such as welding. An elongated bore 29 communicates with the cavity 25 for the passage of a control and output signal cable 30 to the Hall device 13. This cable connects with the D.C. constant-current supply 14 and the preamplifier 16. A suitable handle structure 31 is attached to the upper end of the protective casing 23 to facilitate manipulation of the probe unit.

Figure 3:
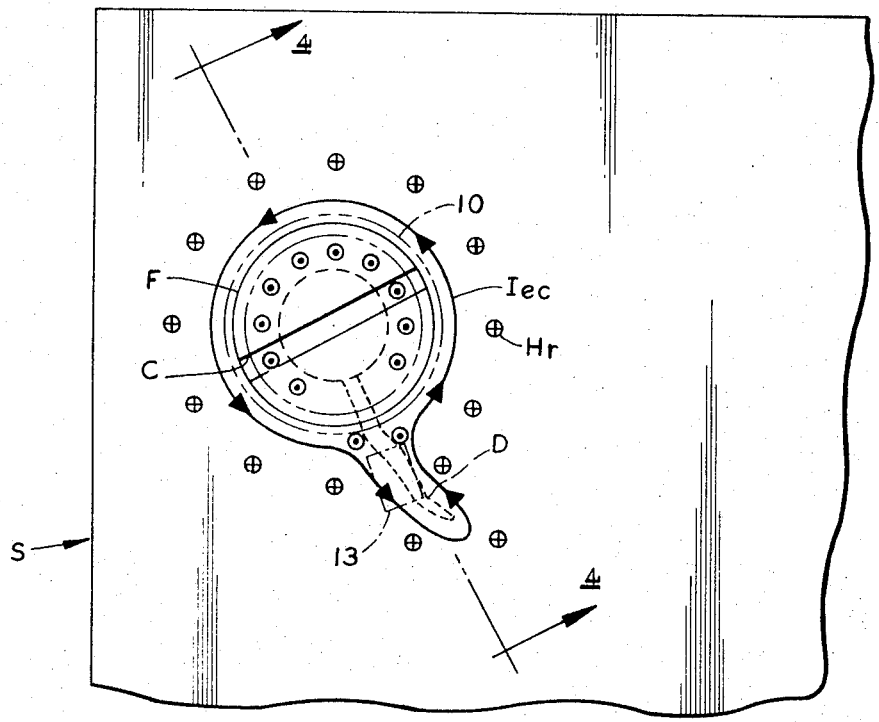
FIGURE 3 is a diagrammatic illustration of the circulating eddy currents and magnetic reaction fields generated in a test specimen through utilization of the apparatus and methods of this invention.
Figure 4:
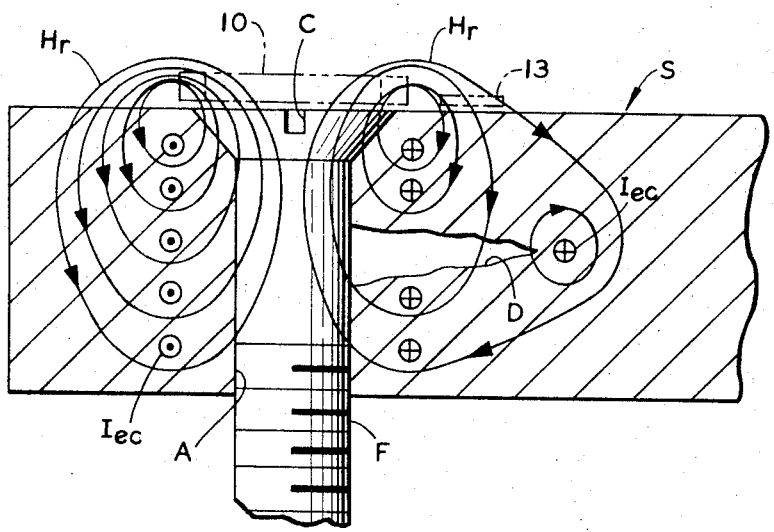
FIGURE 4 is a vertical sectional view taken along lines 4—4 of FIGURE 3.

Testing of a specimen S in accordance with the method of testing of this invention and utilizing the apparatus described hereinbefore is best illustrated in FIGURES 3 and 4. In this application of the invention, the test specimen S comprises a flat, sheet-metal plate which is fabricated from an electrically conductive material and which is formed with an aperture A through which a bolt-type fastening device F projects. The fastening device F comprises a flat-headed cap screw with a screwdriver slot C formed in the head thereof. The aperture A is also formed with a countersunk portion for receiving the interfitting head of the bolt. This particular test specimen S is also illustrated as having a defect D which is in the form of a fissure or crack which is disposed between the surfaces thereof but opening to the aperture A and presents an electrical conduction discontinuity to the eddy currents $I_{ec}$. The defect D is shown for purposes of illustration, and is not to be considered as a limitation on the type and form of defect which the apparatus is capable of detecting. The defect may or may not open at a surface of the test specimen. The aperture A is also shown spaced a distance inwardly from the edges of the test specimen S to eliminate the effect of such edges on the indications of the apparatus and the method of testing.

The inductor coil 10 is shown in broken lines positioned immediately above the upper surface of the test specimen S and having a diameter substantially equal to the diameter of the head of the bolt F. Similarly, the Hall device 13 is shown in broken lines in radially-outwardly displaced relationship to the inductor coil 10 and also immediately above the surface of the test specimen S. The particular dimensions of the inductor coil 10 and relative spacing and location of the Hall device 13 may be varied in a particular embodiment although the diameter of the coil is preferably equal to the diameter of the bolt head. The relative spacing of the Hall device 13 from the coil is determined by the strength of the magnetic fields involved in a particular test situation. Preferably, the Hall device 13 would be placed immediately adjacent the external periphery of the coil 10 for the most advantageous indications of the magnetic-reaction-field. The magnetization field produced by energization of the inductor coil 10 will induce circulation of eddy currents $I_{ec}$ within the test specimen S but these eddy currents $I_{ec}$ are not confined to a single, explicity defined path as in FIGURE 3 or in a number of paths superimposed on each other as in FIGURE 4. The circulating eddy currents will be found distributed throughout the test specimen S in a nonuniform pattern but, in effect, may be considered as substantially concentrated immediately beneath the inductor coil 10, and, in a test speciment wherein defects are not present, will follow substantially the same configuration. These eddy currents will also extend to a depth within the test specimen as determined by the particular operational frequency of the demagnetizing current $I_m$ flowing in the inductor coil 10. A lower frequency magnetizing current $i_m$ will result in a greater penetration of the eddy currents in the test specimen S for detection of defects which appear at a greater depth. A number of lines illustrating the eddy current $I_{ec}$ are included in FIGURE 4 to illustrate the penetration of the eddy currents to a substantial depth within the test specimen. This illustration of the distribution of the eddy currents and their resultant distortion by an electrical discontinuity located within the test specimen indicates the usefulness of the apparatus and method in detecting defects or electrical discontinuities which are not apparent at the surface of the test specimen.

With the formation of the circulating eddy currents $I_{ec}$ in the test specimen S, a magnetic field will be generated and is referred to herein as the magnetic-reaction-field $H_r$. This magnetic-reaction-field is shown coupled with the circulating eddy currents within the test specimen and also extending partially through the space above the test specimen S. Since a greater concentration of eddy currents will be found adjacent the surface of the test specimen which is closest to the inductor coil 10, the magnetic-reaction-field $H_r$ will also be concentrated adjacent this surface.

Assuming that the test specimen is without any such electrically conductive discontinuities as illustrated, the circulating eddy currents $I_{ec}$ will follow a generally symmetrical circular pattern and the magnetic-reaction-field $H_r$ will also be of a substantially symmetrical form. In this instance, maintaining the inductor coil 10 in the same symmetrical relationship to the aperture A or the bolt F will result in maintenance of the circulating eddy currents $I_{ec}$ in a symmetrical configuration. Placing the Hall device 13 in radially outwardly displaced relationship to the inductor coil 10 will result in detection of only a portion of the magnetic-reaction-field $H_r$ which extend into the space above the test specimen S and are in electromagnetically coupled relationship and provide a related output signal. Relative revolution of the Hall device 13 and selected area of the test specimen will provide a constant output signal since the magnetic-reaction-field $H_r$ will remain symmetrical.

The magnetic-reaction-field $H_r$ is formed with numerous lines of flux extending both through the material of the test specimen S adjacent the hole A and also through the bolt F. Accordingly, both the bolt F and the test specimen S will have an effect on the magnetic-reaction-field. Since a relatively large proportion of the flux lines will be found concentrated in the space centrally of the inductor coil 10, this centrally disposed portion of the magnetic field may be considered as representative of all conditions or defects that may be found in both the test specimen and the bolt F. Consequently, detection of the magnetic-reaction-field centrally of the inductor coil 10 will not provide a definite indication of relatively small defects in the test specimen adjacent the aperture A. A defect such as that indicated at D in FIGURES 3 and 4 will have a relatively small effect on the relatively large portion of the magnetic-reaction-field $H_r$ which is concentrated centrally of the coil 10. In actual practice, it has been found that the effect of a small electrical discontinuity occurring in the material surrounding the aperture is substantially masked as the magnetic-reaction-field which is detected centrally of the inductor coil 10 will have a relatively low degree of resolution as to such effects. The distortion of the eddy currents as a consequence of an electrical discontinuity of small proportions occurring in the material surrounding an aperture will not substantially distort the magnetic-reaction-field which is concentrated centrally of the inductor coil 10.

In accordance with this invention, the method of testing greatly enhances the resolution obtainable with the incorporation of commercially available components in the apparatus. The Hall device 13 comprises a relatively small structure and, when disposed externally of the inductor coil, is not responsive to the entire magnetic-reaction-field at any one particular instant. The magnetic flux density of the magnetic-reaction-field external of the effectively concentrated eddy currents $I_{ec}$ within the test specimen is substantially less than that found centrally of the eddy currents. Assuming that the apparatus has a sensitivity such as to be responsive to a relatively reduced magnetic flux density, the apparatus and method of this invention will be found to be capable of detecting a relatively small defect D located within the test specimen S adjacent an aperture A. The eddy currents $I_{ec}$ circulate around the aperture A and are, therefore, not affected by the fact that the aperture A itself presents a discontinuity in the material. An electrical discontinuity D, however, does present such a discontinuity as to affect the configuration of the eddy currents $I_{ec}$ that may be flowing within the localized region of the defect. In the illustrated example, the eddy currents $I_{ec}$ are seen to be distorted and forced to follow a relatively greater path as a result of the nonconduction characteristics of the defect. This distortion of the eddy currents within the region of the defect will result in localized distortion of the magnetic-reaction-field $H_r$ within the vicinity of the defect and is illustrated in FIGURES 3 and 4 as a localized decrease in the net magnetic flux density. Consequently, a Hall device 13, which is responsive to only a relatively small localized portion of the magnetic reaction field, will be substantially affected and provide a smaller output signal which will be indicative of the presence of a defect at the particular area over which the device is positioned. With this method of testing, the effect of a relatively small defect such as D will not be masked by the remainder of the magnetic-reaction-field as the remainder of the magnetic-reaction-field will not be electromagnetically coupled with the Hall device 13 at the particular instance when it is overlying the defect D and is coupled with a localized area of the magnetic-reaction-field.

In one mode of operation of the test apparatus disclosed in FIGURE 1, it may also be necessary to consider the effect of the magnetizing field $H_o$. The effect of the magnetizing field $H_o$ has been discounted in the present description of the operation and method of testing to enhance the clarity. The effect of the magnetizing field $H_o$ may be eliminated through the expedient of closing the switch 21 and introducing the necessary subtractive signal to the amplifier 15 to counteract the effect of this magnetizing field. In an operating mode where the switch 21 is opened, the effect of the magnetizing field $H_o$ may be taken into consideration in the calibration of the apparatus and in either mode of operation, the apparatus will therefore provide an indication of the magnetic-reaction-field and any deviations from a predetermined standard value will indicate the presence of a defect.

The material of the bolt F occupying the aperture A will also have an effect on the indication of the apparatus. Assuming that the bolt is fabricated from a magnetic, electically-conducting material, the magnetic-reaction-field will tend to be concentrated more closely adjacent the aperture A. This results from the fact that the magnetizing field $H_p$ will tend to be more concentrated in the bolt F as a consequence of its lower reluctance and the eddy currents $I_{ec}$ will tend to be concentrated more closely adjacent the aperture A. Although a portion of the eddy current $I_{ec}$ will flow in the bolt itself, the overall result will be an enhancement of the magnetic-reaction-field in the vicinity of the hole. Defects within the bolt F will also affect the magnetic-reaction-field but such defects will not mask the indications produced by defects in the material S adjacent the aperture A since the Hall device 13 is positioned externally of the inductor coils. As the Hall device 13 is angularly displaced about the aperture A, the effect of other defects in the bolt F will produce similar indications.

The apparatus and method of testing provided by this invention may also be utilized to advantage when the bolt F is formed from a nonmagnetic and nonelectrically conducting material as would be the case with the bolt F removed from the hole, although the sensitivity will be slightly reduced from the case where the bolt is formed from a magnetic and electrically conducting material. The magnetic reluctance of this circuit is increased over that of the bolt F formed from a magnetic material and will result in a reduction of the eddy currents $I_{ec}$ which may be induced to flow in the material of the test specimen S. However, this reduction will be at least partially offset as eddy currents will not flow in air. The method and apparatus may also be utilized in the case where the bolt F is formed from an electrically conducting material but not magnetic but the sensitivity is further reduced from either of the two previous cases. By being formed from an electrically conducting material, the eddy currents will also flow in the bolt itself thereby resulting in a decrease in eddy currents flowing within the material of the test specimens surrounding the hole, although the magnetic reluctance of the circuit is as great as when the bolt F has been removed.

The screwdriver slot C has also been found to produce an effect in the indication provided by the Hall device 13. The indication resulting from the presence of the screwdriver slot C, however, is opposite in effect to that produced by a defect, such as D, located within the test specimen S. Accordingly, the effect of a screwdriver slot C may be readily separated from the overall indications provided by the apparatus and the method of testing.

It is readily apparent from the foregoing detailed description that the method of and apparatus for testing of electrically conductive materials permits the advantageous inspection of assembled structures without necessitating removal of the fastening means. The apparatus and method provides a relatively high degree of resolution enabling detection of minute electrical discontinuities which do not necessarily open at the surface of the specimen being tested.

Having thus described this invention, what is claimed is:

1. A magnetic-reaction-test apparatus for non-destructive testing of electrically conductive materials comprising magnetic-field-generating means including a closed loop inductor having an outer peripheral surface positionable in inductively coupled relationship to the material and energizable to induce a flow of eddy currents in the material with the eddy currents being of a predetermined configuration and forming a related magnetic-reaction-field; and magnetic-field-sensing means responsive to the magnetic-reaction-field to provide an output signal related to the magnetic-reaction-field, said magnetic-field-sensing means including a semiconductor device supported a distance radially-outward of the outer peripheral surface of said closed loop inductor in electromagnetically coupled relationship with the magnetic-reaction-field thereby sensing only a portion of the magnetic-reaction-field whereby the output signal is an indication of the characteristics of the respective portion of the material electromagnetically coupled with said semiconductor device by the magnetic-reaction-field.

2. A magnetic-reaction-test apparatus according to claim 1 wherein said semiconductor device comprises a Hall effect device.

3. A magnetic-reaction-test apparatus according to claim 1 wherein said semiconductor device is selectively movable over the surface of the material in predetermined relationship to the predetermined eddy current configuration.

4. A magnetic-reaction test apparatus according to claim 1 wherein said inductor comprises a coil adapted to be placed in juxtaposition to a surface of the material and is symmetrically shaped and said semiconductor device is positioned in the plane of said coil in radially-outward spaced relationship to the outer peripheral surface thereof.

5. The method of nondestructively testing electrically conductive materials having an exterior surface and a hole formed therein which opens at the surface, the method consisting of positioning an elongated pin in the hole with the pin having an outer peripheral surface substantially coextensive with the hole and formed from a material having a permeability greater than unity, juxtaposing a closed loop inductor having an outer peripheral surface, in coaxial alignment with the hole with the outer peripheral surface coextensive with the periphery of the hole and energizing the inductor to induce a flow of circulating eddy currents in the material around the hole thus forming a magnetic-reaction-field related to the characteristics of the material having components external to the surface of the material and radially outward of the outer peripheral surface of the inductor, and sensing the magnetic-reaction-field with magnetic-field-sensing semiconductor means disposed a distance radially outward of the outer peripheral surface of the inductor and juxtaposed to the surface of the material to provide an output signal.

6. The method of claim 5 which includes revolving the magnetic-field-sensing semiconductor means around the hole in predetermined relationship to the periphery of the hole.

References Cited

UNITED STATES PATENTS

| | | | |
|---|---|---|---|
| 3,286,168 | 11/1966 | Schmidt | 324—37 |
| 3,344,347 | 9/1967 | Stevens | 324—45 |
| 3,312,898 | 4/1967 | Browne | 324—45 X |
| 3,359,495 | 12/1967 | McMaster et al. | 324—45 X |

RUDOLPH V. ROLINEC, *Primary Examiner.*

A. E. SMITH, *Assistant Examiner.*

U.S. Cl. X.R.

324—37, 45